(12) United States Patent
Casalini et al.

(10) Patent No.: US 10,738,232 B2
(45) Date of Patent: Aug. 11, 2020

(54) MIXTURE OF SOLVENTS FOR REMOVING ASPHALTENES

(71) Applicants: Versalis S.p.A., San Donato Milanese (MI) (IT); Eni S.p.A., Rome (IT)

(72) Inventors: Alessandro Casalini, Mantova (IT); Attilio Arienti, Mantova (IT); Dario Ghidoni, Gonzaga (IT); Chiara Cecilia Piseri, San Colombano al Lambro (IT)

(73) Assignees: Versalis S.P.A., San Donato Milanese (IT); Eni S.P.A., Rome (IT)

( * ) Notice: Subject to any disclaimer, the term of this patent is extended or adjusted under 35 U.S.C. 154(b) by 164 days.

(21) Appl. No.: 15/564,079

(22) PCT Filed: Apr. 1, 2016

(86) PCT No.: PCT/EP2016/057248
§ 371 (c)(1),
(2) Date: Oct. 3, 2017

(87) PCT Pub. No.: WO2016/156584
PCT Pub. Date: Oct. 6, 2016

(65) Prior Publication Data
US 2018/0148631 A1    May 31, 2018

(30) Foreign Application Priority Data
Apr. 3, 2015 (IT) .............................. MI2015A0483

(51) Int. Cl.
*C09K 8/524* (2006.01)

(52) U.S. Cl.
CPC ..................... *C09K 8/524* (2013.01)

(58) Field of Classification Search
None
See application file for complete search history.

(56) References Cited

U.S. PATENT DOCUMENTS

| 5,382,728 | A | 1/1995 | Del Bianco et al. |
| 5,690,176 | A | 11/1997 | Del Bianco et al. |
| 6,984,614 | B1 | 1/2006 | Als |
| 7,541,315 | B2 | 6/2009 | Jennings |
| 2004/0058827 | A1 | 3/2004 | Jennings |
| 2009/0118380 | A1 | 5/2009 | Ota |
| 2010/0130386 | A1 | 5/2010 | Chakrabarty |
| 2010/0314117 | A1* | 12/2010 | Li ........................... C09K 8/524 166/307 |
| 2012/0273736 | A1* | 11/2012 | James ..................... C09D 7/63 252/519.21 |
| 2014/0202700 | A1 | 7/2014 | Blair |

FOREIGN PATENT DOCUMENTS

| CN | 102876306 B | 1/2013 |
| CN | 103897680 A | 7/2014 |

OTHER PUBLICATIONS

International Search Report and Written Opinion for PCT/EP2016/057248, dated Jun. 8, 2016, 12 pages.
2nd Written Opinion for PCT/EP2016/057248 dated Mar. 10, 2017, 6 pages.

* cited by examiner

Primary Examiner — Jeffrey D Washville
(74) Attorney, Agent, or Firm — Praedcere Law

(57) ABSTRACT

A mixture comprising: a) from 0% to 95% of aromatic compounds and/or polycyclic aromatic compounds, said polycyclic aromatic compounds, if present, always being in an amount less than 10% with respect to component (a); b) from 0% to 85% of a mixture containing aliphatic compounds and a content of aromatic compounds lower than 30% with respect to (b); c) from 0% to 20% of an acetate component; d) from 1% to 50% of a mixture of compounds containing keto groups; with the proviso that said solvent mixture contains at least three components, one of which is (d) and the other two selected from (a), (b) or (c) and that their sum is always 00%; and with the proviso that said mixture has a solubility, measured with the Hansen parameters, characterized in that the dispersion force component of the solubility $\delta_d$ varies from 17 to 20 Mpa$^{-0.5}$ the polar force component of the solubility $\delta_p$ varies from 0.65 to 5 Mpa$^{-0.5}$, and the strength of the hydrogen bond component of the solubility $\delta_h$ varies from 0.65 to 5 MPa$^{-0.5}$.

20 Claims, No Drawings

MIXTURE OF SOLVENTS FOR REMOVING ASPHALTENES

The present invention relates to a mixture of solvents for removing asphaltenes, in particular asphaltenes precipitated in crude oil during its extraction and/or transport.

In particular, the present invention relates to a mixture of solvents for dissolving the asphaltenes precipitated in a conduit during the extraction and/or transport of crude oil, preferably an extraction conduit (tubing) or a transport conduit for crude oil; and/or for dissolving the asphaltenes precipitated from geological formation, particularly in the "near well bore" zone (in the oil-field rocks).

In the present patent application, all the operating conditions included in the text must be considered as preferred conditions even if this is not specifically stated.

For the purpose of this text the term "comprise" or "include" also comprises the term "consist in" or "essentially consisting of".

For the purpose of this text the definitions of the intervals always comprise the extremes unless specified otherwise.

In literature different patent documents are known regarding the same application field as the present invention and that we describe briefly herein.

US 2010/0314117 describes methods and compositions for removing organic deposits, by introducing a fluid comprising at least two non-polar organic solvents and at least two polar organic solvents, allowing such a fluid to at least partially dissolve the organic deposits and removing at least a portion of said fluid. In particular, said fluid is used for removing asphaltene and/or paraffin deposits that form in the oil fields or in the piping and fractures of the production system. The polar organic solvents used comprise cyclopentanone, cyclohexanol, sulfolane, cyclohexanone, N-methyl-2-pyrrolidone, N-methylpyrrolidone, propyl pyrrolidone, butyl pyrrolidone, N-methylmorpholine, N-methylformamide and mixtures thereof. The non-polar organic solvents used comprise D-limonene, dipentene, diesel, kerosene, naphtha, alpha-pinene, beta-pinene, 1-methyl-4-isopropylene-1-cyclohexane and mixtures thereof. Optionally, such fluids may contain an asphaltene inhibitor, for example with a polymeric base, such as formaldehyde-based resins containing alkylphenols or sulfonated alkylphenols.

US 2004/058827 relates to inhibitor compositions useful for treating formation fluids from oil and/or gas wells for reducing paraffin deposits. In particular, in said patent application an inhibitor composition is described which contains: (a) a polymer that has the characteristic of inhibiting the growth of paraffin crystals in formation fluids; (b) a first solvent selected from weak or moderate solvents for paraffins; (c) a second strong solvent for paraffins, in which component (a) is dissolved in a mixture of components (b) and (c). Component (a) used has oleophobic and oleophilic characteristics, such as olefin/maleic esters, olefin/maleic imides, ethylene vinyl acetates, alkyl phenolic resins and alkyl acrylates. Component (b) used may be selected from benzene, toluene, xylene, ethylbenzene, propylbenzene, trimethylbenzene or mixtures thereof. Component (c) can be selected from cyclopentane, cyclohexane, carbon disulfide, decalin and mixtures thereof.

U.S. Pat. No. 7,541,315 relates to compositions useful for treating formation fluids produced in oil and/or gas wells for the purpose of reducing paraffin deposits. Said patent describes an inhibitor composition comprising: (a) a polymer which has the characteristic of inhibiting the growth of paraffin crystals; (b) a first solvent selected from benzene, toluene, xylene, ethylbenzene, propylbenzene, trimethylbenzene and mixtures thereof; and (c) a second solvent selected from cyclopentane, cyclohexane, carbon disulfide, decalin and mixtures thereof; wherein component (a) is dissolved in a mixture of (b) and (c); and wherein polymer (a) is selected from olefin/maleic esters, olefin/maleic imides, ethylene vinyl acetates, alkyl phenolic resins, alkyl acrylates and mixtures thereof.

The compositions described in US 2010/0314117, in US 2004/058827 and in U.S. Pat. No. 7,541,315 present some critical aspects. The use of the polymer is problematic because it is difficult to disperse it in aromatic solvents and it is possible that, especially at low temperatures, it becomes separated from the mixture, blocking the crude oil extraction channel, rather than keeping it free from asphaltene deposits.

U.S. Pat. No. 5,382,728 describes mixtures of hydrocarbons for dissolving asphaltenic residues and for treating oil fields so as to remove asphaltene deposits. The patent describes a ternary composition, as represented in FIG. 1 of the patent; said composition comprising saturated species, alkylbenzenes with $z=-6$, and polyaromatics with $z<-6$, where z is the degree of condensation/unsaturation of the hydrocarbon molecule $C_nH_{2n+z}$. The vertices of the triangular diagram of FIG. 1 of U.S. Pat. No. 5,382,728 are (A) 100% polyaromatics, (B) 100% saturated species, (C) 100% alkylbenzenes.

Although the mixtures proposed work with many types of asphaltenes, they cannot be used with asphaltenes that have a very high molecular weight, for example over 1000 Da. U.S. Pat. No. 5,690,176 describes compositions that can be used for dissolving asphaltene residues, and processes for treating oil wells, heat exchangers and other equipment used in the production of oil, exploiting said mixtures for removing said residues. The compositions described in U.S. Pat. No. 5,690,176 comprise a high level of hydrocarbons and small quantities of nitrogen heterocycles. The compositions comprise: (a) a hydrocarbon fraction that consists of at least 70% aromatic and alkyl aromatic hydrocarbons, where the alkyl group contains from 1 to 4 carbon atoms; (b) a quinoline and isoquinoline fraction as it is or alkyl substituted in which the alkyl group contains from 1 to 4 carbon atoms; in which the weight ratio between (a) and (b) varies from 97.5/2.5 to 75/25.

US 2009/118380 relates to a process for producing water-in-oil or oil-in-water nanoemulsions; said process envisages the dispersing phase being distributed in the form of droplets that have a diameter ranging from 1 to 500 nm, and comprises the following steps:

1) the preparation of a homogeneous water/oil mixture (A) characterized by an interface tension lower than 1 mN/m, comprising water in an amount of 30% to 70% by weight, at least two surface-active agents having a different HLB, selected from non-ionic, anionic, polymeric surface-active agents;
2) the dilution of said homogeneous water/oil mixture in a dispersing phase, whose quality and quantity of the surface-active agent is such as to obtain a nanoemulsion having an HLB different from (A).

The nanoemulsions described in US 2009/118380 can be used as asphaltene inhibitors, preventing the aggregation of asphaltenes in aggregates and clusters. This process is laborious and difficult to apply in the extraction of crude oil. For this sector a system is required with stable solvents and that can be easily transported or easily prepared in situ, neither requirements being met by the nanoemulsion technology.

U.S. Pat. No. 6,984,614 relates to compositions for removing paraffins, waxes or asphaltenes in underground formations, storage tanks and pipes. Said compositions comprise (a) an aqueous solution containing from 18% to 25% of sodium hydroxide; (b) an acetic acid solution containing 30% to 55% by weight of acetic acid with respect to sodium hydroxide; (c) from 15% to 40% by weight with respect to sodium hydroxide of a liquid aromatic hydrocarbon which has 6 to 10 carbon atoms.

This technology, based on three phases, is complicated and not always able to dissolve the less polar asphaltenes where both the soda and acetic acid are insufficiently effective.

US 2014/0202700 relates to biodegradable emulsions for removing asphaltenes, paraffins and deposits which accumulate in wells and along the walls of the conduits of oil installations. Said emulsions are free from aromatic solvents and contain a liquid mixture of an external continuous phase containing orange peel extract, an internal discontinuous phase and two separate emulsifiers.

Although these emulsions are effective, their preparation is laborious, since it is based on the use of an emulsion, to be prepared in situ, which is difficult to transport without the risk of the components separating.

The object of the present invention is to remove asphaltenes, in particular the asphaltenes precipitated in crude oil during its production or transport.

A further object of the present invention is to dissolve the asphaltenes that form during the production of crude oils precipitated in a conduit or well bottom.

To reach said objective the applicant exploits a mixture of solvents which differs from the prior art since said solvents are normally considered, as individual components, not suitable for the objects of the present invention. Moreover, Versalis solvents are Unknown or Variable composition, Complex reaction products or Biological materials (UVCB) and not pure compounds, apart from ketone solvent.

Asphaltenes are a class of lipophilic surface-active hydrocarbon compounds, by nature metastable in crude oil, where under certain thermodynamic conditions, such as a drop in temperature or pressure, they tend to precipitate and therefore to form flakes that could reduce the permeability of the geological formation, or reduce the passage sections in extraction conduits (tubing).

Therefore an object of the present invention is a mixture that comprises:
a) from 0% to 95% of aromatic compounds and/or polycyclic aromatic compounds, said polycyclic aromatic compounds, if present, always being in an amount less than 10% with respect to component (a);
b) from 0% to 85% of a mixture containing aliphatic compounds and a content of aromatic compounds lower than 30% with respect to (b);
c) from 0% to 20% of an acetate component;
d) from 1% to 50% of a mixture of compounds containing keto groups;
with the proviso that said solvent mixture contains at least three components, one of which is (d) and the other two selected from (a), (b) or (c) and that their sum is always 100%; and with the proviso that said mixture has a solubility, measured with the Hansen parameters, characterized in that the dispersion force component of the solubility $\delta_d$ varies from 17 to 20 $\mathrm{Mpa}^{0.5}$, the polar force component of the solubility $\delta_p$ varies from 0.65 to 5 $\mathrm{Mpa}^{0.5}$ and the strength of the hydrogen bond component of the solubility $\delta_h$ varies from 0.65 to 5 $\mathrm{Mpa}^{0.5}$.

Each Hansen parameter is calculated with the weighted average of the corresponding values of the individual solvents.

Surprisingly, according to the teachings of the present patent application, the mixture described and claimed completely dissolves the asphaltene samples without leaving residues, particularly under the operating conditions indicated in the present text and examples.

The mixture described and claimed has the following technical advantages:
complete removal of asphaltene deposits substantially increases the productivity of the well, also guaranteeing production continuity and therefore preventing interruption due to conduit obstruction phenomena;
the mixture has reduced flammability despite having a sufficiently high flash point, which makes it adequately safe in applications during the extraction and production of oil;
the mixture removes asphaltenes in short time even without the presence of solvent agitation with respect to the deposit, therefore in static contact conditions. See examples.
the mixture is suitable for treating all types of asphaltenes, thanks to the possibility of varying the ratio of components according to the type of asphaltenes to be dissolved;
the mixture has low environmental impact;
the mixture is easy to prepare in the ratios indicated according to the prior art;
the mixture is stable, therefore easy to transport also in places that are difficult to reach;
the mixture is also effective at low temperatures;
the suitable flash point for the different crude oils can easily be obtained, even over 61° C.

DETAILED DESCRIPTION

The present patent application relates to a mixture that comprises:
a) from 0% to 95% of aromatic compounds and/or polycyclic aromatic compounds, said polycyclic aromatic compounds, if present, always being in an amount less than 10% with respect to component (a);
b) from 0% to 85% of a mixture containing aliphatic compounds and a content of aromatic compounds lower than 30% with respect to (b);
c) from 0% to 20% of an acetate component;
d) from 1% to 50% of a mixture of compounds containing keto groups;
with the proviso that said solvent mixture contains at least three components, one of which is (d) and the other two selected from (a), (b) or (c) and that their sum is always 100%; and with the proviso that said mixture has a solubility, measured with the Hansen parameters, characterized in that the dispersion force component of the solubility $\delta_d$ varies from 17 to 20 $\mathrm{Mpa}^{0.5}$, the polar force component of the solubility $\delta_p$ varies from 0.65 to 5 $\mathrm{Mpa}^{0.5}$ and the strength of the hydrogen bond component of the solubility $\delta_h$ varies from 0.65 to 5 $\mathrm{Mpa}^{0.5}$.

All the percentages indicated in the present patent application can be considered on a weight basis.

In the mixtures described and claimed in the present patent application, the dispersion force component of the solubility $\delta_d$ varies from 17 to 20 $\mathrm{Mpa}^{0.5}$, the polar force component of the solubility $\delta_p$ varies from 0.65 to 5 $\mathrm{Mpa}^{0.5}$ and the strength of the hydrogen bond component of the solubility $\delta_h$ varies from 0.65 to 5 $\mathrm{Mpa}^{0.5}$.

In the mixtures described and claimed in the present patent application, component (a) may preferably range from 0.5% to 95%, more preferably from 3% to 95%, more preferably from 10% to 95%, more preferably from 50% to 95%.

In the mixtures described and claimed in the present patent application, component (b) may preferably range from 0.5% to 85%, more preferably from 3% to 85%, more preferably from 10% to 75%, more preferably from 30% to 70%.

In the mixtures described and claimed in the present patent application, component (c) may preferably range from 0.5% to 20%, more preferably from 3% to 20%, more preferably from 5% to 15%.

In the mixtures described and claimed in the present patent application, component (d) may preferably range from 3% to 70%, more preferably from 3% to 60%, more preferably from 3% to 55%.

In a preferred embodiment the present invention is a mixture comprising:
a) from 0.5% to 95% of aromatic compounds and/or polycyclic aromatic compounds, said polycyclic aromatic compounds, if present, always being in an amount less than 10% with respect to component (a);
b) from 0% to 85% of a mixture containing aliphatic compounds and a content of aromatic compounds lower than 30% with respect to (b);
c) from 0.5% to 20% of an acetate component;
d) from 3% to 70% of a mixture of compounds containing keto groups;
with the proviso that the sum of components (a), (b), (c) and (d) is always 100%, and that said mixture has a solubility, measured with the Hansen parameters, characterized in that the dispersion force component of the solubility $\delta_d$ varies from 17 to 20 Mpa$^{-0.5}$, the polar force component of the solubility $\delta_p$ varies from 0.65 to 5 Mpa$^{-0.5}$ and the strength of the hydrogen bond component of the solubility $\delta_h$ varies from 0.65 to 5 Mpa$^{-0.5}$.

In the mixtures described and claimed in the present patent application, component (a) may preferably be selected from isomers of trimethylbenzene, aromatic compounds having a molecular weight that varies from 78 kg/kmol to 128 kg/kmol, aromatic compounds containing at least one naphthalene ring which must always be present in quantities of less than 10% with respect to (a). More preferably, component (a) may be selected from hemimellitene (also known as 1,2,3-Trimethylbenzene vic.-Trimethylbenzene), pseudocumene (also known as 1,2,4-Trimethylbenzene asym.-Trimethylbenzene) and mesitylene (1,3,5-Trimethylbenzene sym.-Trimethylbenzene), iso-propyl benzene (cumene), n-propyl benzene, 3-ethyl-toluene, 2-ethyl-toluene, 4-ethyl-toluene; desulfurized turpentine (see Tables 3-5); o-xylene, p-xylene, m-xylene and mixtures of xylenes (see Tables 3-5); a solvent comprising at least 60% of aromatic hydrocarbons, such as Solvesso 100 or 150; or a mixture of alkylbenzenes, more preferably polyethylbenzenes, even more preferably diethylbenzenes; trieline; and mixtures thereof.

In the mixtures described and claimed in the present patent application, component (b) may be preferably selected from marine diesel oil, decane or dodecane and mixtures thereof.

In the mixtures described and claimed in the present patent application, component (c) may preferably be selected from butyl acetate, 2-ethyl hexyl acetate, alkyldiacetates or butyl diglycol acetate, and mixtures thereof.

In the mixtures described and claimed in the present patent application, component (d) may preferably be selected from aliphatic ketones, phenyl-aliphatics, or cyclic aliphatics and mixtures thereof; more preferably it may be selected from acetone, acetophenone, cyclohexanone, cyclopentanone, cycloheptanone and mixtures thereof. A particularly preferred component (d) may be a mixture that comprises from 30% to 70% of cyclohexanone and from 70% to 30% of acetophenone (commercial product known as Versalis e-solv G).

The mixtures described and claimed in the present patent application may be prepared according to the methods of the prior art. A preferred method for preparing said mixtures envisages mixing the various components directly in tankers and according to an appropriate loading sequence; or it envisages mixing the components in a dedicated tank.

The mixtures described and claimed in the present patent application may be used during the step of injection and/or addition of additives by mixing in line with other products which would otherwise not be compatible with the polycyclic aromatic compounds (e.g. asphaltene) both during the transport of the crude oil and during its extraction.

The mixtures described and claimed in the present patent application may be selected from a very high number of combinations according to the cost of the components, based on cost-effectiveness, and based on the need to obtain a flash point (f.p.) greater than or equal to 61° C., i.e. higher than the minimum required for a given application.

Asphaltenes are a class of hydrocarbon compounds, and in particular are defined on the basis of their solubility in solvents. In this sense, asphaltenes are a fraction of crude oil that is insoluble in light aliphatic hydrocarbons (such as pentane or heptane), but soluble in aromatic solvents (e.g. toluene). Based on the concept of solubility, various methods have been developed for extracting and determining the asphaltene content. One of the simplest and most cost effective laboratory methods consists of separating extracted oil which has lost its gas content, into Saturates, Aromatics, Resins and Asphaltenes (SARA) exploiting the various solubilities and polarities.

The SARA fraction is separated from the other components by adding an n-alkane (e.g. n-heptane or propane). The remaining components, maltenes, are separated by fractionation using different solvents (D. Vazquez, G. A. Mansoori, Journal of Petroleum Science and Engineering 26 (2000) 49-55).

The SARA asphaltenes are dark, crumbly solids with a density of 1.2 g/cm$^3$. They do not have a melting point but decompose when heated, leaving carbon residues (D. Vazquez, G. A. Mansoori, Journal of Petroleum Science and Engineering 26 (2000) 49-55).

Asphaltenes contain different polyaromatic structures with aliphatic chains, heteroatoms (sulfur, nitrogen, oxygen), metals such as nickel, vanadium and iron in percentages that vary according to the type of oil. The metals form complexes and provide electric charges that can affect the deposit of the asphaltenes.

The average composition of each element in the asphaltenes is shown in table 1 (Trejo et al., Asphaltenes Chemical Transformation during Hydroprocessing of Heavy Oils, CRC Press).

TABLE 1

| Element | % weight |
|---------|----------|
| C | 76-86 |
| H | 7.3-8.5 |
| S | 5-9 |
| O | 0.7-1.2 |

TABLE 1-continued

| Element | % weight |
| --- | --- |
| N | 1.3-1.4 |
| Metals (Ni, V, Fe) | 0.1-0.2 |

The mixture described and claimed in the present patent application has various components, therefore it was necessary to predict the solvent action in relation to asphaltenes through the solubility parameters studied by Hildebrand in the 1940s and rationalized by Hansen in the three contributions: $\delta_p$ (polar), $\delta_h$ (hydrogen bond), $\delta_d$ (dispersion). The Hansen parameters estimate three important forces that affect solubility and whose sum of squares is the "Hildebrand solubility" parameter according to the following equation: $\delta_t^2 = \delta_p^2 + \delta_h^2 + \delta_d^2$.

$\delta_t$ is the total Hildebrand solubility parameter, $\delta_d$ is the dispersion force component of the solubility, $\delta_p$ is the polar force component of the solubility and $\delta_h$ is the strength of the hydrogen bond component of the solubility.

$\delta_d$ represents the dispersive or cohesive force. In non-polar solvents this force is predominant. It is a measurement of the molecular interactions created by temporary differences in electronic distribution. The heat of vaporization may be used to estimate the dispersive force.

$\delta_p$ is an estimate of the cohesive polar force. It is a force created by the permanent difference in density of electrons created when electron rich atoms and electron poor atoms are found in the same molecule. The polar forces can be estimated by the dipolar moments of the molecules.

$\delta_h$ is the hydrogen bond parameter. It is the measurement of the capacity to exchange electrons through hydrogen bonds. It can be estimated by the heat of mixing, or calculated as the difference with respect to the other parameters.

Table 2 shows the Hansen parameters of two asphaltenes, extracted from a well in Canada (CaAs) and from a well in the Middle East (ArAs1), calculated by Takashi Sato et al. (Takashi Sato, Sadao Araki, Masato Morimoto, Hideki Yamamoto in Energy Fuels 2014, 28, 891-897.

TABLE 2

| Asphaltene | $\delta_d$ (+/−0.1) | $\delta_p$ (+/−0.1) | $\delta_h$ (+/−0.1) |
| --- | --- | --- | --- |
| CaAs | 19 | 4.2 | 4.4 |
| ArAs1 | 19.4 | 3.4 | 4.2 |

EXAMPLES

We now illustrate some descriptive but not limitative examples of the present invention. The experimental tests were obtained with the methods described herein.

Said method is based on the loss in weight of a sample of asphaltene, placed in a metal mesh crucible, and statically immersed in the mixture of solvents for a defined time. The laboratory equipment used is as follows: 100 ml tall beaker, analytical balance with precision of 0.0001 g, spatula, tweezers, stainless steel mesh crucible with diameter of 10 mm, height approximately 20 mm, mesh size 0.14 mm (FIG. 1), pentane.

The empty crucible was weighed after being cleaned and dried ($P_{crog}$). Approximately 0.2 g, exactly weighed, of asphaltenic deposit was placed in the crucible. The crucible containing the sample was weighed ($P_{iniz}$). With the aid of tweezers, the crucible containing the sample was immersed in a beaker containing 100 ml of the solvent mixture to be tested. The sample was left immersed in the solvent mixture, resting on the bottom, for 100 minutes, without agitating or moving the receptacle. Still with the aid of tweezers, the crucible was extracted and the excess solvent removed, immersing it and extracting it three times in a beaker containing pentane. The sample was left to dry under a flow of air in a suction hood for at least one night. The crucible with the residual sample was weighed ($P_{fin}$).

$P_{crog}$ is the weight of the empty crucible, $P_{iniz}$ is the weight of the crucible with the initial sample and $P_{fin}$ is the weight of the crucible with the sample at the end of the test.

The percentage of dissolved asphaltene was calculated according to the following formula:

$$\% \; disciolta = \left(1 - \frac{P_{fin} - P_{crog}}{P_{iniz} - P_{crog}}\right) \times 100$$

In the comparative and invention examples, the Applicant shall refer to Tables 3, 4, 5 and 6. The tests in which the asphaltenes were at least 50% dissolved are considered positively passed; very good results are obtained when the dissolution of asphaltenes is at least 80%; excellent results are obtained when the asphaltenes are 100% dissolved.

Comparative Examples C1-C7

Various comparative examples were performed which have the use of diesel in common as a component present in the highest quantity. The other components are varied and are present in lower quantities. Such tests had a negative outcome in terms of dissolving capacity of asphaltenes, as indicated in Table 3. The dissolution of the asphaltenes was lower than 50% or even null in some cases. Pure polyethylbenzene also had a negative outcome. As can be seen, components $\delta_p$ and $\delta_h$ in some comparative tests were below the 0.65 limit, or greater than 4, or component $\delta_d$ was below the 17 limit.

Invention Examples IN1-IN23

Numerous examples representative of the invention were performed. See Tables 4, 5 and 6, which highlighted very good or excellent dissolution of asphaltenes, i.e. always over 80%.

Results of Experimental Tests

Table 3 summarizes all the results of the tests performed, using in the prepared mixtures both prevalently aliphatic components and aromatic components. In both cases, it was possible to obtain at least 80% dissolution of the asphaltenes, a very good result, taking care to appropriately adjust all the other components present (co-solvents). The percentage of asphaltene dissolved is shown on the line "Dissolved-%". The first columns specify the dispersive ($\delta_d$), polar ($\delta_p$) and Van der Waals or hydrogen bridge ($\delta_h$) components, of the individual solvents used to dissolve the asphaltene. The second column contains the total Hildebrand parameter, calculated from the three aforementioned components. The individual components for calculating the Hildebrand parameter were taken from C. Hansen, Hansen Solubility Parameters, A User's Handbook 2nd Ed. 2007, CRC Press.

Only hydrocarbonic components of the solvent mixture, either aromatic or aliphatic, provide a dissolution of asphaltenes lower than 25% and in some cases even null.

A polar component must be introduced to the mixture, such as a ketone, to reach total dissolution of the asphaltene deposit. On the other hand, asphaltenes have heteroatoms in their structure which introduce a polar component into the system.

In order to work effectively, the new solvent mixture must have a Hansen solubility parameter, calculated through the dispersive ($\delta_d$), polar ($\delta_p$) and Van der Waals or hydrogen bridge ($\delta_h$) components, as indicated below:

$\delta_d$: between 17 and 20 $\text{Mpa}^{0.5}$
$\delta_p$: between 0.65 and 5 $\text{Mpa}^{0.5}$
$\delta_h$: between 0.65 and 5 $\text{Mpa}^{0.5}$ In light of these considerations, aromatic based solvents with a mixture of ketone solvents added to them (preferably acetophenone with cyclohexanone) were selected for the applicative assessment, which provide a good flash point, the correct density, tolerance to humidity and a good HSE profile.

Notes relating to Tables 3-6 and the description.
(1) Jet A1: kerosene for jets.
(2) Desulfurized turpentine: mixture of aliphatic hydrocarbons decane/dodecane 50/50 (one of components b in the described and claimed mixture).
(3) Marine diesel oil: diesel with a maximum 2% sulfur content, for example Exxon Mobil Marine Fuel.
(4) mixture of xylenes such as 60% m-xylene/20% o-xylene/20% p-xylene.
(5) Reformed: type of naphtha from reforming with CAS=68919-37-9.
(6) C9: C9 aromatic mixture containing iso-propyl benzene (cumene), n-propyl benzene, 3-ethyl-toluene, 2-ethyl-toluene, 4-ethyl-toluene, 1,3,5-trimethylbenzene, 1,2,4-trimethylbenzene (from Versalis plant, Dunkerque).
(7) Bottom of column C1B of the Versalis plant in Sarroch containing 56% of trimethylbenzene, the remaining part comprising ethyldimethylbenzenes, diethylbenzenes and naphthalenes.
(8) Head of column C1A of the Versalis plant in Sarroch containing 68% of ethyltoluene, 19% of trimethylbenzene, 3% of cumene, 10% of n-propylbenzene.

TABLE 3

| Component | Hildebrand Parameter | $\delta_d$ | $\delta_p$ | $\delta_h$ | C1 % | C2 % | C3 % | C4 % | C5 % | C6 % | C7 % |
|---|---|---|---|---|---|---|---|---|---|---|---|
| Decalin | 18.0 | 18 | 0 | 0 | 50 | | | | | | |
| Solvesso 150 | 18.1 | 18 | 1 | 1 | | | | | | | |
| Jet A1[1] | 17.5 | 17.5 | 0.5 | 0.5 | | | | | | | |
| Desulfurized turpentine[2] | 17.5 | 17.5 | 0.5 | 0.5 | | | | | | | |
| Marine diesel oil[3] | 16.3 | 16.3 | 0 | 0 | 50 | 50 | 50 | 75 | 75 | 75 | |
| Mixed xylenes[4] (60/20/20) | 18.0 | 17.7 | 1 | 3.1 | | 50 | | | | | |
| Polyethyl-benzenes | 17.5 | 17.5 | 0.5 | 0.5 | | | | 25 | | | 100 |
| Diethyl-benzenes | 17.8 | 17.8 | 0.1 | 0.8 | | | | | 25 | | |
| Pseudocumene | 18.1 | 18 | 1 | 1 | | | | | | | |
| REFORMED [5] | 17.8 | 17.8 | 0.1 | 0.8 | | | | | | | |
| C9 [6] | 17.8 | 17.8 | 0.1 | 0.8 | | | 25 | | | | |
| Tetralin | 19.9 | 19.6 | 2 | 2.9 | | | 25 | | | | |
| Cyclohexanone | 19.6 | 17.8 | 6.3 | 5.1 | | | | | | 5 | |
| Olone | 20.6 | 17.6 | 5.2 | 9.3 | | | | | | | |
| Acetophenone | 21.7 | 19.6 | 8.6 | 3.7 | | | | | | 10 | |
| Dimethyl sulfoxide | 26.7 | 18.4 | 16.4 | 10.2 | | | | | | 10 | |
| Dissolved—% | | | | | 0 | 0 | 23 | 0 | 0 | 0 | 0 |
| Hildebrand parameter mixture | | | | | 17.2 | 17.1 | 17.6 | 16.6 | 16.7 | 18.0 | 17.5 |
| $\delta_d$ mixture | | | | | 17.2 | 17.0 | 17.5 | 16.6 | 16.7 | 16.9 | 17.5 |
| $\delta_p$ mixture | | | | | 0.0 | 0.5 | 0.5 | 0.1 | 0.0 | 2.8 | 0.5 |
| $\delta_h$ mixture | | | | | 0.0 | 1.6 | 0.9 | 0.1 | 0.2 | 1.6 | 0.5 |

TABLE 4

| Component | Hildebrand Parameter | $\delta_d$ | $\delta_p$ | $\delta_h$ | IN1 % | IN2 % | IN3 % | IN4 % | IN5 % | IN6 % | IN7 % | IN8 % | IN9 % |
|---|---|---|---|---|---|---|---|---|---|---|---|---|---|
| Decalin | 18.0 | 18 | 0 | 0 | | | | | | | | | |
| Solvesso 150 a | 18.1 | 18 | 1 | 1 | | | | | | | | | 80 |
| Jet A1[1] | 17.5 | 17.5 | 0.5 | 0.5 | | | | | | 30 | | | |
| Desulfurized turpentine[2] | 17.5 | 17.5 | 0.5 | 0.5 | | | | 60 | | 30 | | | |
| Marine diesel oil[3] | 16.3 | 16.3 | 0 | 0 | | | | | 30 | 30 | | | |
| Mixed xylenes[4] (60/20/20) | 18.0 | 17.7 | 1 | 3.1 | | | | | | | | | |
| olyethyl benzenes | 17.5 | 17.5 | 0.5 | 0.5 | | | | | | | | | |
| Diethyl benzenes | 17.8 | 17.8 | 0.1 | 0.8 | 75 | 70 | 80 | | | | 85 | | |
| Pseudocumene | 18.1 | 18 | 1 | 1 | | | | | | | | | |
| FC-1B [7] | 18.1 | 18 | 1 | 1 | | | | | | | | | |
| REFORMED [5] | 17.8 | 17.8 | 0.1 | 0.8 | | | | | | | | | |

TABLE 4-continued

| Component | Hildebrand Parameter | $\delta_d$ | $\delta_p$ | $\delta_h$ | IN1 % | IN2 % | IN3 % | IN4 % | IN5 % | IN6 % | IN7 % | IN8 % | IN9 % |
|---|---|---|---|---|---|---|---|---|---|---|---|---|---|
| C9 [6] | 17.8 | 17.8 | 0.1 | 0.8 | | | | | | | | 80 | |
| Tetralin | 19.9 | 19.6 | 2 | 2.9 | | | | | | | | | |
| Cyclohexanone | 19.6 | 17.8 | 6.3 | 5.1 | 10 | 10 | 20 | 10 | 20 | 20 | 5 | 10 | 10 |
| Olone | 20.6 | 17.6 | 5.2 | 9.3 | | | | | | | | | |
| Acetophenone | 21.7 | 19.6 | 8.6 | 3.7 | 15 | 15 | 20 | 10 | 20 | 20 | 10 | 10 | 10 |
| Dimethyl sulfoxide | 26.7 | 18.4 | 16.4 | 10.2 | | 5 | | | | | | | |
| Dissolved—% | | | | | 100 | 99 | 100 | 100 | 89 | 89 | 98 | 84 | 99 |
| Hildebrand parameter mixture | | | | | 18.6 | 18.1 | 18.8 | 18.4 | 18.4 | 18.4 | 18.3 | 18.4 | 18.6 |
| $\delta_d$ mixture | | | | | 18.1 | 18.1 | 18.0 | 18.0 | 17.6 | 17.6 | 18.0 | 18.0 | 18.1 |
| $\delta_p$ mixture | | | | | 2.0 | 2.8 | 3.0 | 1.6 | 3.1 | 3.1 | 1.3 | 1.6 | 2.3 |
| $\delta_h$ mixture | | | | | 1.7 | 2.1 | 1.8 | 1.5 | 1.9 | 1.9 | 1.3 | 1.5 | 1.7 |

TABLE 5

| Component | Hildebrand Parameter | $\delta_d$ | $\delta_p$ | $\delta_h$ | IN10 % | IN11 % | IN12 % | IN13 % | IN14 % | IN15 % | IN16 % | IN17 % | IN18 % | IN19 % |
|---|---|---|---|---|---|---|---|---|---|---|---|---|---|---|
| Decalin | 18.0 | 18 | 0 | 0 | | | | | | | | | | |
| Solvesso 150 a | 18.1 | 18 | 1 | 1 | | | | 90 | | | 94 | | | |
| Jet A1 [1] | 17.5 | 17.5 | 0.5 | 0.5 | | 80 | 70 | | 70 | 76 | | | | |
| Desulfurized turpentine [2] | 17.5 | 17.5 | 0.5 | 0.5 | | | | | | | | | | |
| Marine diesel oil [3] | 16.3 | 16.3 | 0 | 0 | | | | | | | | | | |
| Mixed xylenes [4] (60/20/20) | 18.0 | 17.7 | 1 | 3.1 | | | | | | | | | | |
| Polyethyl benzenes | 17.5 | 17.5 | 0.5 | 0.5 | | | | | | | | | | |
| Diethyl benzenes | 17.8 | 17.8 | 0.1 | 0.8 | | | | | | | | | | |
| Pseudocumene | 18.1 | 18 | 1 | 1 | | | | | | | | | | 94 |
| FC-1B [7] | 18.1 | 18 | 1 | 1 | | | | | | | | 94 | | |
| T-C1A [8] | 18.1 | 18 | 1 | 1 | | | | | | | | | 94 | |
| REFORMED [5] | 17.8 | 17.8 | 0.1 | 0.8 | 80 | | | | | | | | | |
| C9 [6] | 17.8 | 17.8 | 0.1 | 0.8 | | | | | | | | | | |
| Tetralin | 19.9 | 19.6 | 2 | 2.9 | | | | | | | | | | |
| CYCLOHEXANONE | 19.6 | 17.8 | 6.3 | 5.1 | 10 | 10 | 15 | 5 | 20 | 16 | 3 | 3 | 3 | 3 |
| OLONE | 20.6 | 17.6 | 5.2 | 9.3 | | | | | | | | | | |
| ACETOPHENONE | 21.7 | 19.6 | 8.6 | 3.7 | 10 | 10 | 15 | 5 | 10 | 8 | 3 | 3 | 3 | 3 |
| Dimethyl sulfoxide | 26.7 | 18.4 | 16.4 | 10.2 | | | | | | | | | | |
| Dissolved—% | | | | | 100 | 81 | 96 | 98 | 97 | 84 | 100 | 100 | 100 | 100 |
| Hildebrand parameter mixture | | | | | 18.4 | 18.1 | 18.5 | 18.3 | 18.3 | 18.2 | 18.2 | 18.2 | 18.2 | 18.2 |
| $\delta_d$ mixture | | | | | 18.0 | 17.7 | 17.9 | 18.1 | 17.8 | 17.7 | 18.0 | 18.0 | 18.0 | 18.0 |
| $\delta_p$ mixture | | | | | 1.6 | 1.9 | 2.6 | 1.6 | 2.5 | 2.1 | 1.4 | 1.4 | 1.4 | 1.4 |
| $\delta_h$ mixture | | | | | 1.5 | 1.3 | 1.7 | 1.3 | 1.7 | 1.5 | 1.2 | 1.2 | 1.2 | 1.2 |

TABLE 6

| Component | Hildebrand Parameter | $\delta_d$ | $\delta_p$ | $\delta_h$ | IN20 % | IN21 % | IN22 % | IN23 % |
|---|---|---|---|---|---|---|---|---|
| Decalin | 18.0 | 18 | 0 | 0 | | | | |
| Solvesso 150 a | 18.1 | 18 | 1 | 1 | 83.1 | 81.9 | 81.9 | |
| Jet A1 [1] | 17.5 | 17.5 | 0.5 | 0.5 | | | | |
| Desulfurized turpentine [2] | 17.5 | 17.5 | 0.5 | 0.5 | | | | |
| Marine diesel oil [3] | 16.3 | 16.3 | 0 | 0 | | | | |
| Mixed xylenes [4] (60/20/20) | 18.0 | 17.7 | 1 | 3.1 | | | | |
| Polyethyl benzenes | 17.5 | 17.5 | 0.5 | 0.5 | | | | |
| Diethyl benzenes | 17.8 | 17.8 | 0.1 | 0.8 | | | | 81.9 |
| Pseudocumene | 18.1 | 18 | 1 | 1 | | | | |
| FC-1B [7] | 18.1 | 18 | 1 | 1 | | | | |
| T-C1A [8] | 18.1 | 18 | 1 | 1 | | | | |
| REFORMED [5] | 17.8 | 17.8 | 0.1 | 0.8 | | | | |
| C9 [6] | 17.8 | 17.8 | 0.1 | 0.8 | | | | |
| Tetralin | 19.9 | 19.6 | 2 | 2.9 | | | | |
| CYCLOHEXANONE | 19.6 | 17.8 | 6.3 | 5.1 | 4.3 | 4.5 | 4.5 | 4.5 |
| OLONE | 20.6 | 17.6 | 5.2 | 9.3 | | | | |
| ACETOPHENONE | 21.7 | 19.6 | 8.6 | 3.7 | 4.3 | 4.5 | 4.5 | 4.5 |
| Dimethyl sulfoxide | 26.7 | 18.4 | 16.4 | 10.2 | | | | |

TABLE 6-continued

| Component | Hildebrand Parameter | $\delta_d$ | $\delta_p$ | $\delta_h$ | IN20 % | IN21 % | IN22 % | IN23 % |
|---|---|---|---|---|---|---|---|---|
| n-butyl acetate | 17.4 | 15.8 | 3.7 | 6.3 | 8.3 | 9.1 | | |
| 2-ethyl esilacetate | 16.9 | 15.8 | 2.9 | 5.1 | | | 9.1 | 9.1 |
| Dissolved—% | | | | | 100 | 100 | 100 | 100 |
| Hildebrand parameter mixture | | | | | 18.3 | 18.3 | 18.2 | 18.0 |
| $\delta_d$ mixture | | | | | 17.9 | 17.9 | 17.9 | 17.7 |
| $\delta_p$ mixture | | | | | 1.8 | 1.8 | 1.5 | 0.8 |
| $\delta_h$ mixture | | | | | 1.7 | 1.8 | 1.7 | 1.5 |

The invention claimed is:

1. A solvent mixture for removing asphaltenes precipitated in crude oil comprising:
   a) from 0% to 95% of aromatic compounds and/or polycyclic aromatic compounds, said polycyclic aromatic compounds, if present, always being in an amount less than 10% with respect to component (a);
   b) from 0% to 85% of a mixture containing aliphatic compounds and a content of aromatic compounds lower than 30% with respect to (b);
   c) from 0% to 20% of an acetate component;
   d) from 1% to 50% of a mixture of compounds containing keto groups;
   with the proviso that said solvent mixture contains at least three components, one of which is (d) and the other two selected from (a), (b) or (c) and that their sum is always 100%; and with the proviso that said solvent mixture has a solubility, measured with the Hansen parameters, adapted for removing asphaltenes precipitated in crude oil, wherein the dispersion force component of the solubility $\delta_d$ varies from 17 to 20 MPa$^{0.5}$, the polar force component of the solubility $\delta_p$ varies from 0.65 to 5 MPa$^{0.5}$ and the strength of the hydrogen bond component of the solubility $\delta_h$ varies from 0.65 to 5 MPa$^{0.5}$.

2. The solvent mixture according to claim 1, wherein said component (a) ranges from 0.5% to 95%.

3. The solvent mixture according to claim 2, wherein said component (a) ranges from 50% to 95%.

4. The solvent mixture according to claim 1, wherein said component (b) ranges from 0.5% to 85%.

5. The solvent mixture according to claim 4, wherein said component (b) ranges from 30% to 70%.

6. The solvent mixture according to claim 1, wherein said component (c) ranges from 0.5% to 20%.

7. The solvent mixture according to claim 6, wherein said component (c) ranges from 5% to 15%.

8. A solvent mixture comprising:
   a) from 0% to 95% of aromatic compounds and/or polycyclic aromatic compounds, said polycyclic aromatic compounds, if present, always being in an amount less than 10% with respect to component (a);
   b) from 0% to 85% of a mixture containing aliphatic compounds and a content of aromatic compounds lower than 30% with respect to (b);
   c) from 0% to 20% of an acetate component;
   d) from 3% to 70% of a mixture of compounds containing keto groups;
   with the proviso that said solvent mixture contains at least three components, one of which is (d) and the other two selected from (a), (b) or (c) and that their sum is always 100%; and with the proviso that said solvent mixture has a solubility, measured with the Hansen parameters, adapted for removing asphaltenes precipitated in crude oil, wherein the dispersion force component of the solubility $\delta_d$ varies from 17 to 20 MPa$^{0.5}$, the polar force component of the solubility $\delta_p$ varies from 0.65 to 5 MPa$^{0.5}$ and the strength of the hydrogen bond component of the solubility $\delta_h$ varies from 0.65 to 5 MPa$^{0.5}$.

9. The solvent mixture according to claim 8, wherein said component (d) ranges from 3% to 55%.

10. A solvent mixture comprising:
    a) from 0.5% to 95% of aromatic compounds and/or polycyclic aromatic compounds, said polycyclic aromatic compounds, if present, always being in an amount less than 10% with respect to component (a);
    b) from 0.5% to 85% of a mixture comprising at least 30% of aliphatic compounds and a content of aromatic compounds lower than 30% with respect to component (b);
    c) from 0.5% to 20% of an acetate component;
    d) from 3% to 70% of a mixture of compounds containing keto groups;
    with the proviso that the sum of components (a), (b), (c) and (d) is always 100%, and that said solvent mixture has a solubility, measured with the Hansen parameters, adapted for removing asphaltenes precipitated in crude oil, wherein the dispersion force component of the solubility $\delta_d$ varies from 17 to 19 MPa$^{0.5}$, the polar force component of the solubility $\delta_p$ varies from 0.65 to 5 MPa$^{0.5}$ and the strength of the hydrogen bond component of the solubility $\delta_h$ varies from 0.65 to 5 MPa$^{0.5}$.

11. The solvent mixture according to claim 1 wherein said component (a) is selected from isomers of trimethylbenzene, aromatic compounds having a molecular weight ranging from 78 kg/kmol to 128 kg/kmol, compounds containing at least one naphthalene ring which must always be present in amounts less than 10, and mixtures thereof.

12. The solvent mixture according to claim 1 wherein said component (b) is selected from marine diesel oil, decane or dodecane and mixtures thereof.

13. The solvent mixture according to claim 1 wherein said component (c) is selected from butyl acetate, 2-ethyl hexyl acetate, alkyldiacetates or butyl diglycol acetate and mixtures thereof.

14. The solvent mixture according to claim 1 wherein said component (d) is selected from aliphatic ketones, phenyl aliphatics, or cyclic aliphatics, and mixtures thereof.

15. The solvent mixture according to claim 14 wherein said component (d) is a mixture which comprises from 30% to 70% of cyclohexanone and 70% to 30% of acetophenone.

16. The solvent mixture according to claim 10 wherein said component (a) is selected from isomers of trimethylbenzene, aromatic compounds having a molecular weight ranging from 78 kg/kmol to 128 kg/kmol, compounds containing at least one naphthalene ring which must always be present in amounts less than 10, and mixtures thereof.

17. The solvent mixture according to claim 10 wherein said component (b) is selected from marine diesel oil, decane or dodecane and mixtures thereof.

18. The solvent mixture according to claim 10 wherein said component (c) is selected from butyl acetate, 2-ethyl hexyl acetate, alkyldiacetates or butyl diglycol acetate and mixtures thereof.

19. The solvent mixture according to claim 10 wherein said component (d) is selected from aliphatic ketones, phenyl aliphatics, or cyclic aliphatics, and mixtures thereof.

20. The solvent mixture according to claim 19 wherein said component (d) is a mixture which comprises from 30% to 70% of cyclohexanone and 70% to 30% of acetophenone.

* * * * *